Figure 5:
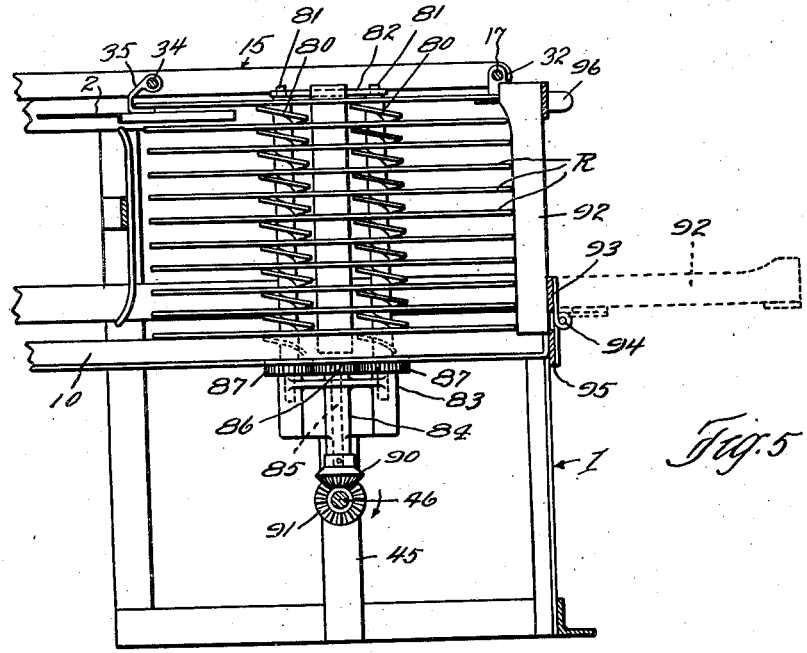

Feb. 17, 1931.    T. W. SMALL    1,792,553
AUTOMATIC GRAPHOPHONE
Filed July 9, 1928    6 Sheets-Sheet 1
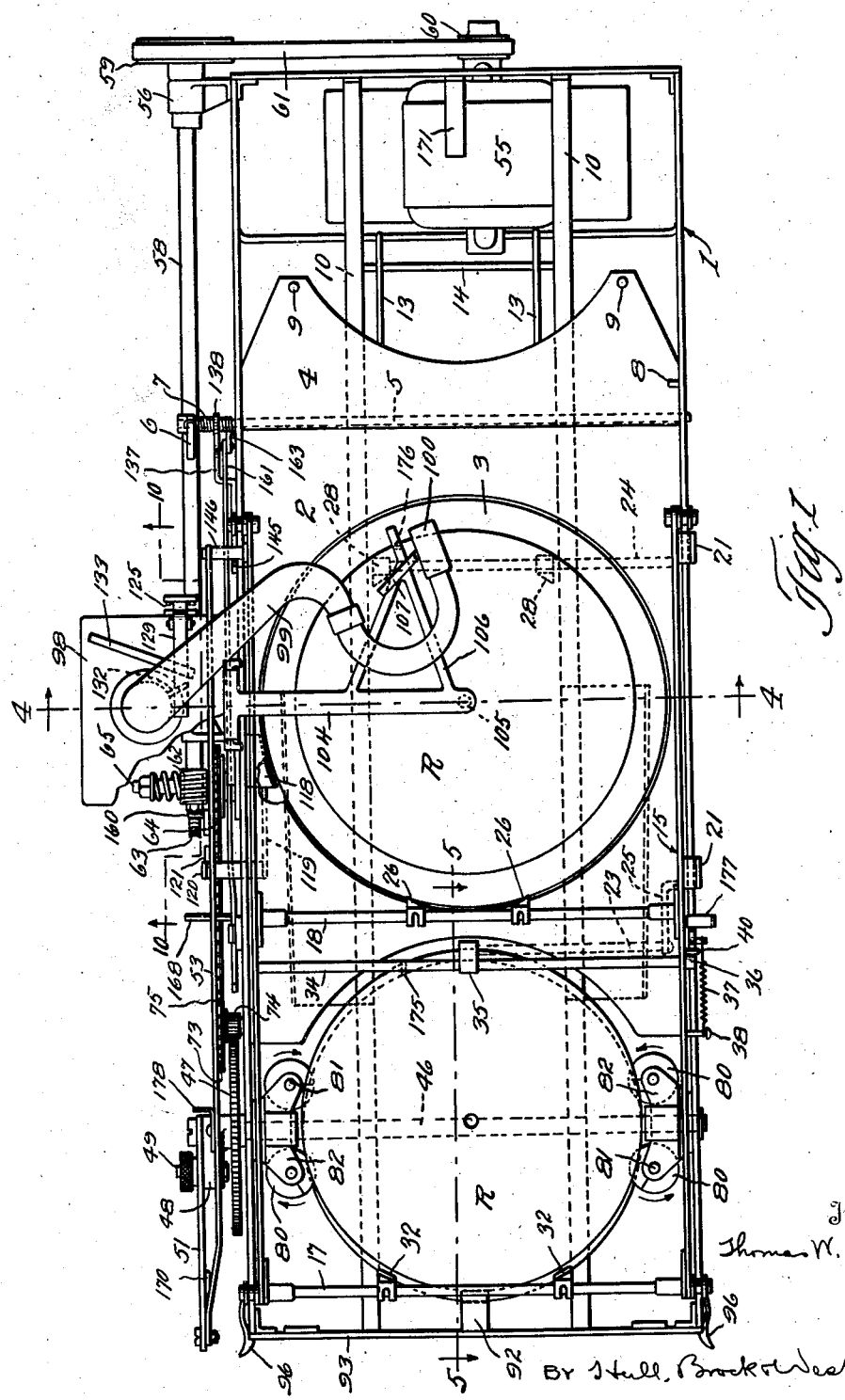

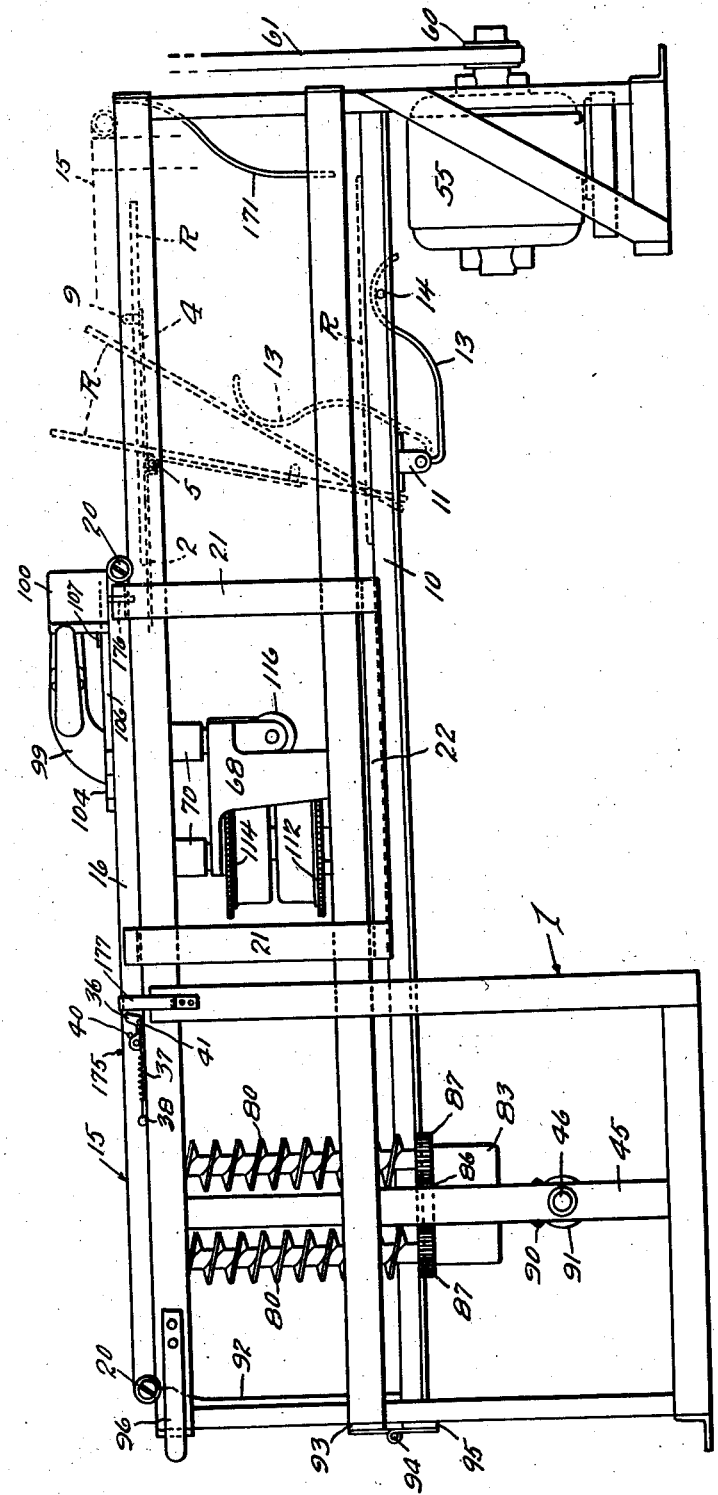

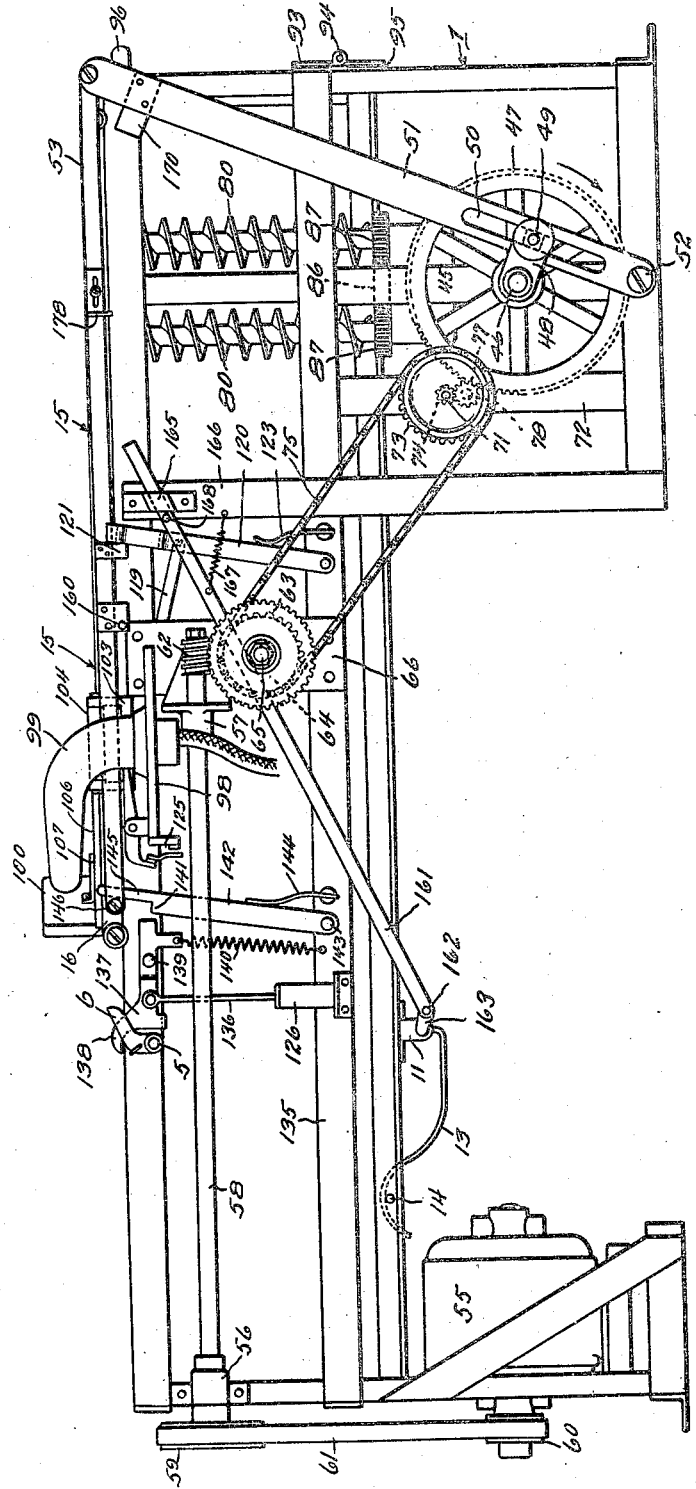

Feb. 17, 1931.   T. W. SMALL   1,792,553
AUTOMATIC GRAPHOPHONE
Filed July 9, 1928    6 Sheets-Sheet 4

Inventor
Thomas W. Small
By Hill, Brock & West
Attorneys

Feb. 17, 1931. T. W. SMALL 1,792,553
AUTOMATIC GRAPHOPHONE
Filed July 9, 1928 6 Sheets-Sheet 5
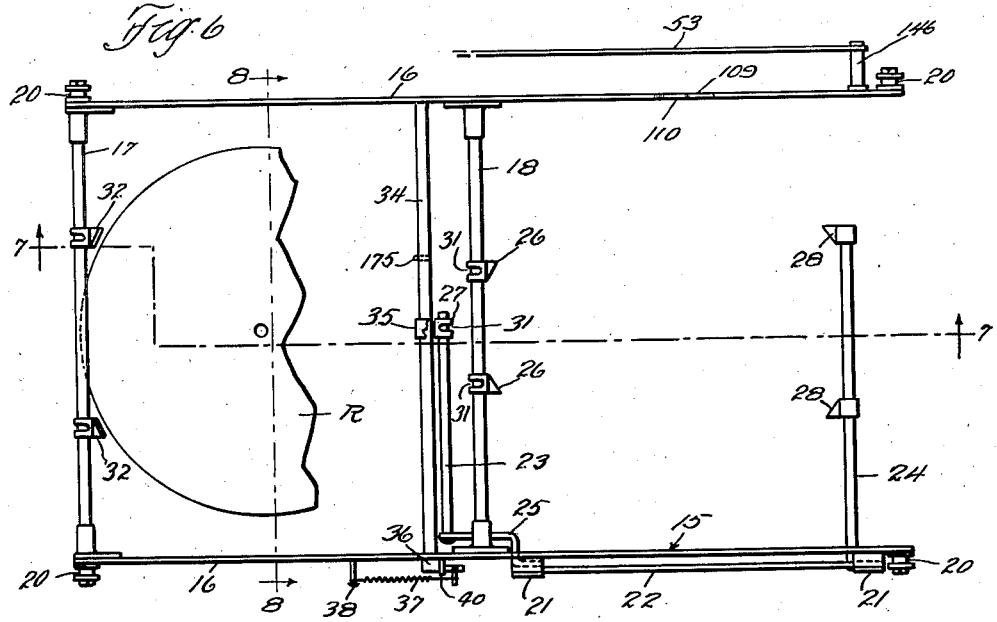
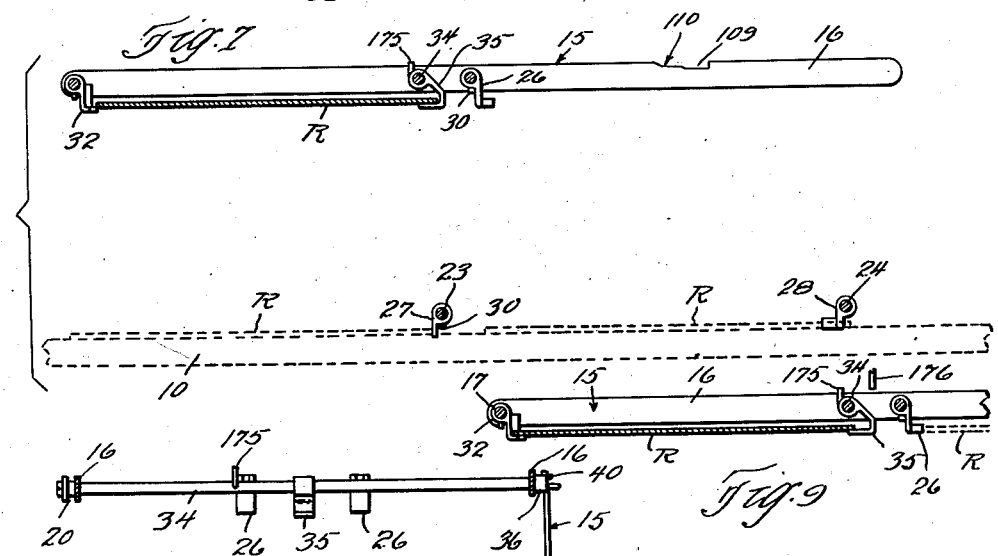
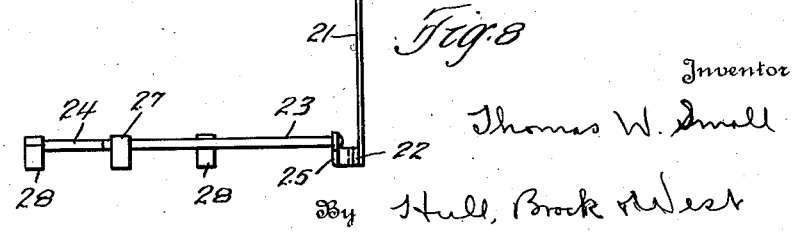
Inventor
Thomas W. Small
By Hull, Brock & West
Attorneys.

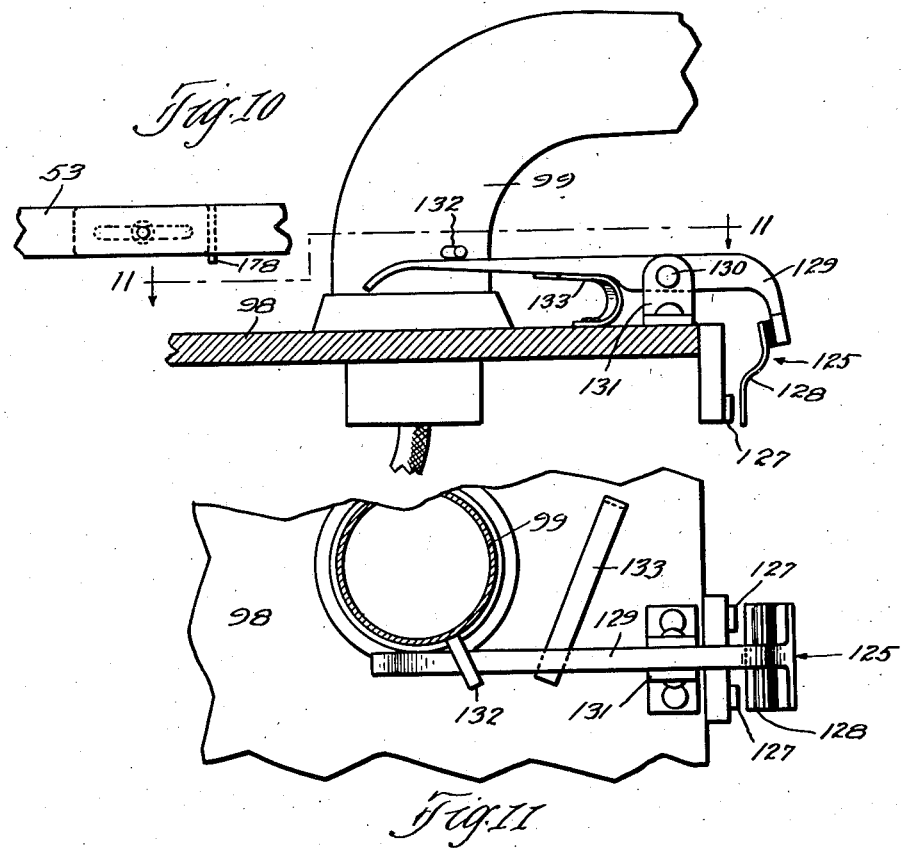
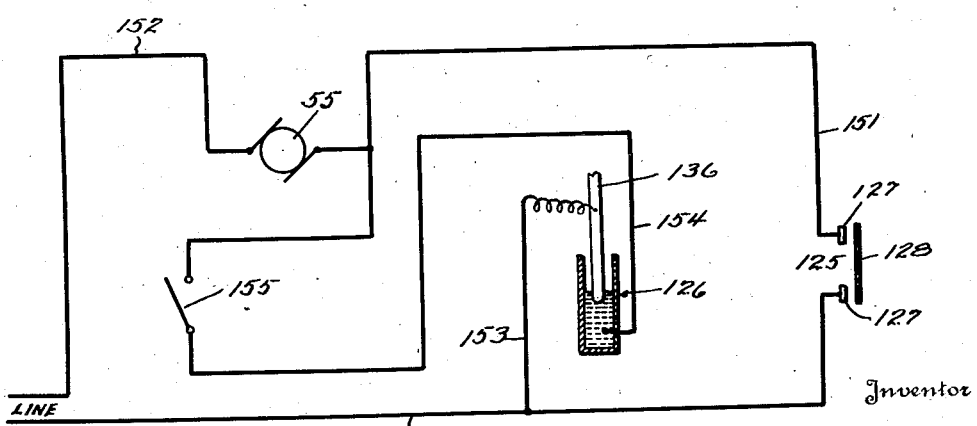

Patented Feb. 17, 1931

1,792,553

UNITED STATES PATENT OFFICE

THOMAS W. SMALL, OF HUNTINGTON, INDIANA, ASSIGNOR, BY MESNE ASSIGNMENTS, TO THE CAPEHART CORPORATION, OF FORT WAYNE, INDIANA, A CORPORATION OF INDIANA

AUTOMATIC GRAPHOPHONE

Application filed July 9, 1928. Serial No. 291,221.

My present invention relates to improvements in sound reproducing machines of the same class as that to which my copending application, Serial No. 209,241, filed July 29, 1927, pertains.

In the class of machines referred to, a plurality of disk records are supported in a magazine and are automatically fed therefrom, one after another, to the record rotating means or turntable in operative relation to the sound reproducer, thereby to play said records in succession.

In my present, as in my former, invention, the records are reversed or turned over after leaving the turntable and are returned to the end of the magazine opposite that from which the records are removed; and the records are automatically fed from the receiving toward the discharging end of the magazine so that each record as it arrives at the latter end is in a position to be transferred from the magazine to the record rotating means or turntable.

Among the objects of my present invention is the provision of a magazine by which the records are supported properly and in accurate position for reception by the transferring means and in such manner that any one or more of the records may be withdrawn from the magazine and reversed or replaced by another or others without disturbing the remaining records, and so that the records in the magazine may be rearranged at will, and while the machine is in operation if desired.

Another object of the invention is to provide improved means for transferring the records from the magazine to the rotating means or turntable and which acts to bodily carry the records from the former to, and deposit them in playing position upon, the latter.

A further object is to improve the mechanism for reversing the records and lowering them to the guideway or track by which they are conducted to the receiving end of the magazine.

A still further object is to improve, generally, and in some respects cheapen the construction of my former machine, and the foregoing objects, with others hereinafter appearing, are attained in the embodiment of the invention illustrated in the accompanying drawings wherein like reference characters designate corresponding parts throughout the several views. For the sake of clearness, and so that the mechanical features may be illustrated on a somewhat larger scale, I have omitted from the drawings the cabinet or casing wherein the mechanism is housed.

Figure 4:
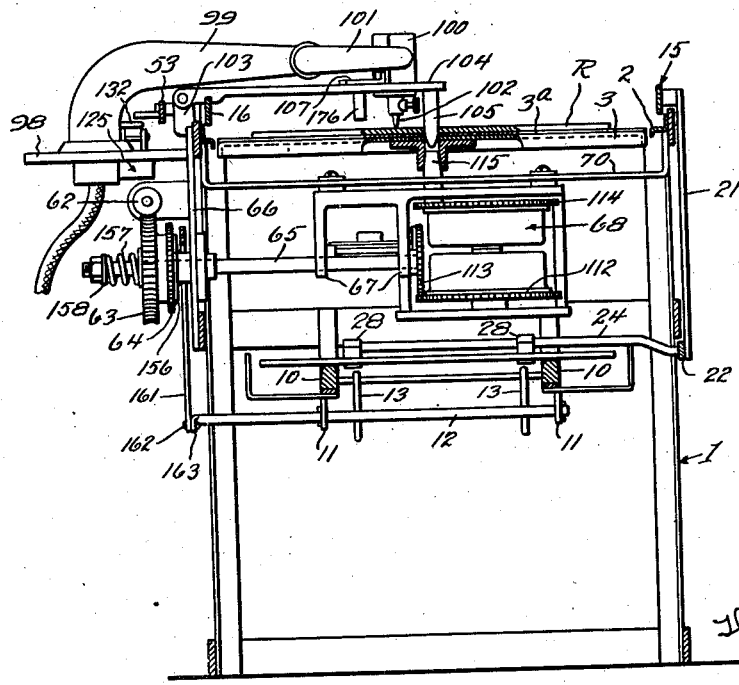

In the drawings, Fig. 1 is a plan view of my improved automatic graphophone; Fig. 2 is a front elevation of the same, certain parts that appear clearly in other views being omitted to avoid confusion of lines; Fig. 3 is a rear elevation of the machine; Fig. 4 is a central vertical section through the machine, substantially on the line 4—4 of Fig. 1; Fig. 5 is a fragmentary vertical, longitudinal section embracing the magazine end of the machine, the section being taken on the line 5—5 of Fig. 1 and as though looking in the direction of the arrows associated with said line; Fig. 6 is a plan view of the carriage showing its normal relation to a record in the magazine; Figs. 7 and 8 are sections through the carriage substantially on the respective lines 7—7 and 8—8 of Fig. 6; Fig. 9 is a fragmentary sectional detail of the carriage, showing it advanced to a position near that wherein it drops the record onto the turntable, the dotted lines in said view representing a record in the act of being removed from the turntable by means of the carriage; Fig. 10 is an enlarged vertical sectional detail on the correspondingly numbered line of Fig. 1, showing a switch that is controlled by the tone arm; Fig. 11 is a sectional plan view on the line 11—11 of Fig. 10; and Fig. 12 is a diagram showing the electric circuits involved in the machine.

The frame of the machine is shown as a built-up structure of rectangular form and is designated generally by the reference numeral 1. Supported in a horizontal portion by, and centrally within the upper portion of, the frame 1 is a stationary table 2 having a circular opening within which a turntable 3 rotates, the upper surface of the stationary table 2 being in substantially the same plane as the corresponding surface of the turntable 3, as best shown in Fig. 4, the turntable being of usual form and having its upper surface constituted of a sheet 3ª of felt or the like. Beyond one end of the stationary table 2 (the right hand end as the machine is viewed in Figs. 1 and 2) is a leaf 4 that is fastened to a shaft 5 which has its ends journaled in opposed parts of the frame 1, and to the rear end of the shaft 5 is fastened an arm 6 (Figs. 1 and 3). The shaft 5 extends a material distance beyond the frame member wherein its rear end is journaled, and a spring 7 is coiled about the protruding end of the shaft and has one of its extremities anchored to the frame while its opposite end is engaged with the arm 6, the spring being so disposed as to tend to rock the shaft 5 in a direction to maintain the leaf 4 against a stop 8 on the front frame member and in substantially the plane of the stationary table 2. Parts hereinafter to be described cooperate with the arm 6 in such a way as to rock the shaft 5 in opposition to the spring 7 and swing the leaf 4 downwardly to the position indicated in Fig. 2. Near its free end, the leaf 4 is equipped with record rests 9.

Extending from end to end of the frame 1 a suitable distance below its top is a track comprised of rails 10, and the upper surfaces of these rails are smooth and highly polished for a purpose presently to appear. Journaled within hangers 11 (Figs. 2, 3 and 4) that depend from the rails 10 are the bearing portions of a shaft 12 which carries a pair of fingers 13. It will be noted, especially from Figs. 1 and 4, that the fingers 13 are located immediately inwardly of the rails 10. The free ends of the fingers curve gradually upwardly and then backwardly and when the fingers are in normal position rest upon a bar 14 that is carried by and between the rails 10.

Reciprocable lengthwise of the top of the frame 1 is a carriage 15 that is shown in detail in Figs. 6, 7, 8 and 9. This carriage is made up of side bars 16 that are connected together and spaced apart at their left hand ends (as the carriage is viewed in Figs. 1, 2, 6, 7 and 8) by a rod 17, and intermediate their ends by a rod 18. The ends of the side bars 16 are equipped with supporting means or rollers 20 that bear upon, and transverse, the longitudinal top members of the frame 1, said top members thus constituting a track for the carriage. Depending from the forward side of the carriage 15 are hangers 21 (Figs. 2, 4 and 8) whose lower ends are connected together by a brace 22. Rods 23 and 24 are rigidly secured to and extend inwardly from the lower ends of the hangers 21, the former rod being secured to the adjacent hanger through the medium of a bracket 25. These rods are disposed a slight distance above the rails 10, and they extend rearwardly a short distance beyond the longitudinal center of the machine, the one designated 24 being somewhat longer than the other. The position of the rods with respect to the rails 10 is indicated in Fig. 4 where the rod 24 is shown in elevation.

Supported for oscillation on the respective rods 18 and 23 are lugs 26 and 27, and fixed against oscillation upon the rod 24 are lugs 28. The purpose of these lugs will presently appear. As a convenient means of retaining the lugs 26 and 27 in place on the respective rods 18 and 23 in such manner as will permit of their oscillation, I employ pins 30 (Fig. 7) that extend through circumferential slots 31 in the hubs of the lugs and are secured within apertures of the rods. The hubs of the lugs 28 are pinned or otherwise secured against rotation to the rod 24. Journaled for oscillation upon the rod 17, in substantially the same maner as that above described in connection with lugs 26 and 27, are hooks 32. Spaced along the carriage 15 from the rod 17 a distance substantially equal to the diameter of a record is a shaft 34 whose ends are journaled in the side bars 16 of the carriage. Fastened to the shaft 34 at about its longitudinal center is the hub portion of a relatively deep hook 35 that is in opposed relation to the hooks 32 on the rod 17; and to the forward end of the shaft 34, beyond the corresponding side bar of the carriage, is secured a trigger 36. This trigger is held in both of its extreme positions by a spring 37, one end of which is fastened to the trigger and the other, at 38, to the side bar of the carriage. This result of the spring holding the trigger in both of its extreme positions is made possible by the fact that the trigger swings to its extreme positions on opposite sides of a straight line drawn through the center of oscillation of the trigger and the fixed end of the spring. The swing of the trigger is limited in one direction by a stop 40, and in the opposite direction by the engagement of a pin 41 that is carried by the trigger—and, incidentally, to which the spring 37 is attached—with the top edge of the adjacent frame member. The means for rotating the shaft 34 in a direction to swing the trigger against the stop 40, and the means for returning the trigger to normal position wherein the pin 41 engages the frame member, will be presently described.

I shall next take up the mechanism for reciprocating the carriage 15. Journaled within front and rear uprights 45 of the machine frame is a shaft 46 to the rear end of which is secured a gear 47, and, beyond the gear, a crank 48. The pin 49 of the crank 48 operates within a slot 50 of an arm 51 that is pivoted at 52 to the frame 1 below and in the vertical plane of the shaft 46. The free end of the arm 51 is connected by a link 53 to the forward end of the rear side bar 16 of the carriage 15. It is apparent from the foregoing that each time the shaft 46 makes a revolution the carriage 15 is given a complete reciprocation.

The shaft 46 is driven, through connections which I will now describe, by an electric motor 55 that is supported in the lower right hand side of the frame 1 (as the parts are viewed in Figs. 1 and 2). Journaled within bearings 56 and 57 (Fig. 3) that are supported by the frame 1 is a shaft 58 which has a pulley 59 secured to its end adjacent the bearing 56 in the plane of a pulley 60 that is fastened to the shaft of the motor 55. A belt 61 is engaged about said pulleys. Where the shaft 58 extends beyond the bearing 57 it is equipped with a worm 62 that meshes with a worm wheel 63 to which is fixed a sprocket 64. The unit composed of the worm wheel 63 and the sprocket 64 is loosely mounted on a shaft 65 (Figs. 1, 3 and 4) that is journaled near its rear end in a part 66 of the frame 1 and in hangers 67 which are parts of the housing of a spring motor designated generally by the reference numeral 68 and by means of which motor the turntable is driven, as will presently appear. In all essential respects, the spring motor is of the standard type, and the motor housing is sustained by cross members 70 of the machine frame (Figs. 2 and 4). Supported upon a stud 71 (Fig. 3) that is carried by an upright member 72 in the rear of the frame 1, is a unit composed of a sprocket wheel 73 and a pinion 74. The former has engaged about it a chain 75 which also cooperates with the previously mentioned sprocket 64 and the pinion 74 meshes with an idler gear 77 that is journaled on a stud 78 supported by the previously mentioned upright 72, and the idler gear 77, in turn, meshes with the gear 47.

The record magazine is situated in the left hand end of the machine, as the same is viewed from the front, and it involves two pairs of screws that are engaged by the diametrically opposite sides of the records. The screws of each pair are designated 80, and the upper and lower ends of their shafts 81 are journaled, respectively, in brackets 82 and 83. Each of the brackets 83 includes a bearing 84 in which is journaled a shaft 85 that carries a spur gear 86 at its upper end, and this gear meshes with similar gears 87 that are fastened to the shafts 81 of the corresponding screws 80. Pinned or otherwise secured to the lower ends of the shafts 85 are bevel pinions 90 that mesh with similar pinions 91, secured to the shaft 46, so that each time the shaft 46 is rotated it will impart like movement to the screws through the connections comprising the pinions 90 and 91, the shafts 85 and the gears 86 and 87.

The records, designated R, are supported by the threads of the screws 80 in horizontal position, as shown in Fig. 5, and the threads of the screws on opposite sides of the machine are inclined in opposite directions and the screws are rotated in the direction indicated by the arrows in Fig. 1, and this action of the screws tends, through the frictional contact of the threads of the screws with the records, to shift the records toward the adjacent end of the machine and against a guide 92. Preferably, the guide 92 is on a gate, designated 93, that is connected, by a hinge 94, to a horizontal frame member 95. The gate is adapted to be held in closed position by spring latches 96. When the gate is thrown open, access may be had to all records in the magazine so that they may be rearranged, reversed, or replaced by others, according to the desires of the user.

It will be noted that the record engaging surface of the guide 92 is deflected inwardly at its upper end, and this is for the purpose of advancing the top record in a direction toward the center of the machine sufficiently to permit it to escape the hooks 32 that are carried by the rod 17 of the carriage 15.

The sound reproducing apparatus constitutes no part of my present invention excepting as to certain structural features that cooperate with the other parts of the machine for controlling the machine's operation and for shifting the sound reproducer in the automatic playing of the records. According to the present disclosure, I employ an electrical pick-up device that is carried by the so-called tone arm in substantially the same manner that the sound box is applied to the tone arm in the machine that constitutes the subject matter of my prior application hereinbefore mentioned; and with this electrical pick-up may be employed the usual amplifying apparatus and loud speaker which may be placed in any desirable location, as beneath the central portion of the frame 1 within the cabinet (not shown) that encloses the structure herein illustrated.

The electrical pick-up device, amplifying apparatus, etc., form no part of the instant invention and, excepting for the pick-up device, are omitted from the drawings. So far as the present invention is concerned the common type of sound reproducing apparatus might be employed, involving the usual sound box, tone arm, and horn, and since the electrical pick-up device is, in fact, a sound reproducer, it will hereinafter be referred to as such; and the term as herein used is intended to embrace any device having the virtue of reproducing a selection on a record.

A shelf 98 is supported by, and extends rearwardly from, the middle portion of the frame 1, and rotatably connected to this shelf is the tone arm 99 which carries the sound reproducer 100 at its forward end, the tone arm involving a jointed section 101 which permits the reproducer to be raised and lowered with respect to the rear portion of said arm. The needle or stylus of the sound reproducer is designated 102.

Pivotally connected to a bracket 103 that rises from the rear upper edge of the frame 1 in substantially the vertical plane of the pivotal axis of the tone arm, is the rear end of a lever 104 that carries a centering pin 105 at its forward end for cooperation with the holes of the records for properly locating them in playing position on the turntable 3. Extending laterally from the forward end of the lever 104 is a guide 106 for cooperation with a shoe 107 that projects rearwardly from the sound reproducer 100. The lever 104 rests upon the rear side rail 16 of the carriage 15, and when the parts are in playing position, said lever occupies a notch 109 (Figs. 6 and 7) formed in the upper edge of said side rail, one end of said notch being inclined gradually to constitute a cam portion that is designated 110.

As previously stated, the spring motor 68 for operating the turntable is of standard construction and, as appears from Fig. 4, the same includes a spring enclosing drum having attached to it a gear 112 that meshes with a pinion 113 on the forward end of the previously mentioned shaft 65. The spring (not shown) is wound when its enclosing drum is rotated through said gearing, and a gear 114, situated adjacent the top of the motor is so connected to the spring as to be driven thereby. Through suitable transmission gearing (not shown) the rotation of the gear 114 is imparted to a spindle 115 that carries the turntable 3. The speed of the turntable is controlled in the usual way by a governor that is designated generally by the reference numeral 116, in Fig. 2.

A brake 118, shown in Fig. 1, cooperates with the peripheral flange of the turntable for stopping the rotation of the table, said brake being in the nature of a block or shoe that is adapted to be urged into contact with the table by a link 119 that is suitably connected to a lever 120. As shown best in Fig. 3, a lug 121 that is carried by the link 53 is arranged to engage the free end of the lever 120. The lug 121 serves to move the lever in a direction to retract the brake 180 from engagement with the turntable, while a spring 123 tends to move the lever in the opposite direction to set the brake.

The circuits through which current is supplied to the motor 55 are illustrated in the diagram of Fig. 12 and they include two switches 125 and 126, the latter being shown as one of the mercury cup type. The switch 125 is disclosed in a general way in Fig. 1, and in detail in Figs. 10 and 11, and the same is mounted upon the previously mentioned shelf 98. This switch involves spaced contact points 127, and a bridge plate 128 that is carried by, and insulated from, a lever 129 that is pivoted at 130 to a bracket 131 that rises from the shelf 98. The end of the lever 129 opposite the bridge plate 125 extends in close proximity to the pivoted end of the tone arm 99 and in position to be engaged by a pin 132 that extends radially from the vertical portion of the tone arm. A leaf spring 133, that is carried by the shelf 98 and pressed upwardly against the adjacent end of the lever 129, tends to rock said lever in a direction to engage the bridge plate 128 with the contact points 127. It will be noted that the extremity of the lever 129 wherewith the pin 132 cooperates is inclined so that when the tone arm is swung from a position wherein the pin 132 is beyond the end of the lever, to the position shown in the drawings, said pin will ride over the end of the lever and depress the same thereby to withdraw the bridge plate 128 from the contact points 127. It is manifest from this that the tone arm will act to open the switch 125 when it is swung in a direction to locate the sound reproducer 100 in starting position adjacent the periphery of a record supported by the turntable.

As will appear particularly from Fig. 3, the switch 126 is supported by a rear longitudinal frame member 135, and the upper end of the plunger 136 of said switch is pivoted to one end of a lever 137 that incorporates a cam portion 138. The lever 137 is pivoted at 139 to an adjacent part of the machine frame, and it is rocked by a spring 140 in a direction to elevate the end having the cam portion 138 and to which the plunger 136 is attached. The opposite end of the lever cooperates with an abutment 141 of a latch 142 that is pivoted at 143 to the aforesaid frame member 135, and a spring 144 tends to rock said latch in a direction to engage the abutment 141 beneath the adjacent end of the lever 137. An extension 145 of the latch is adapted to be engaged by a part 146 that connects the link 53 with the rear rail 16 of the carriage 15.

Referring again, and with greater particularity, to the circuit diagram of Fig. 12, a conductor 150 leads from one side of the "line" (which represents the source of current) to one side of the switch 125. The opposite side of said switch is connected, through a conductor 151, with the motor 55, and the current returns through a conductor 152 to the opposite side of the "line" or source. A conductor 153 leads from the conductor 150 to one side of the switch 126, while the opposite side of this switch is electrically connected through a conductor 154 with the motor 55, said conductor 154 including a manually operated switch 155.

As the machine is illustrated in the drawings, the parts are in playing condition. A record R is on the turn-table 3, the lever 104 is down with the centering pin 105 in the hole of the record, and the brake 118 is released so that the spring motor 68 may rotate the turntable. With the parts in this condition, the switches 125 and 126 are both open wherefore the circuit of the motor 55 is broken at two points and the mechanism actuated thereby is at rest. It will be assumed, however, that the manually operated switch 155 is closed. As the record rotates, the tone arm will be swung inwardly by reason of the fact that the needle or stylus of the sound reproducer 100 follows the groove of the record in the usual way as it approaches the center of the record, and after the selection on the record has been completed, the pin 132 on the tone arm 99 will ride off the end of the lever 129 of the switch 125 and allow the spring 133 to rock said lever in a direction to engage the bridge plate 128 with the contact points 127 and close the switch 125 and establish a circuit through the motor 55 by way of the conductors 150, 151 and 152. Upon the energization of the motor 55, the shaft 58 will be driven to rotate the unit composed of the worm wheel 63 and sprocket 64. A friction disk 156 is mounted on the shaft 65 adjacent the unit comprising the worm 63 and sprocket 64, and said unit is urged into frictional engagement with said disk by a spring 157 that surrounds the portion of the shaft protruding rearwardly of said unit and is compressed between the unit and an abutment 158 that is adjustable on the outer end of the shaft. The disk 156 is suitably secured to the shaft 65, and when the tension of the spring of the turntable motor 68 is inferior to the friction between the aforesaid unit and the disk 156, the shaft will be driven through the medium of the friction disk to wind the spring of the turntable motor. When said spring has attained a predetermined tension, the disk 156 will slip on the adjacent face of said unit and avoid undue strain being imposed upon the parts. Thus it will be seen that each time the electric motor operates it rewinds the spring motor to its maximum tension.

From the time the shaft 58 starts rotating the power is transmitted therefrom through the train of gearing previously described to the shaft 46. As this shaft rotates, the arm 51 is swung on its pivot 52 to reciprocate the carriage 15 through the intervention of the link 53. As the carriage advances, the cam portion 110 of the notch 109, that is occupied during the playing position by the lever 104, engages said lever and lifts it thereby to withdraw the centering pin 105 from the hole of the record that is on the turntable and, at the same time, to elevate the sound reproducer 100 through the guide 106 and shoe 107. The lugs 26 on the rod 18 of the carriage 15 will engage the edge of the record on the turntable and slide the same forwardly until its advancing edge approaches the record rests 9 on the leaf 4 of the record reversing mechanism; and simultaneously with this removal of the record from the turntable, the topmost record in the magazine is carried over and deposited upon the turntable by means of the hooks 32 and 35 as I shall now explain. Immediately after the carriage starts on its forward excursion, the hooks 32 that are carried by the rod 17 of the carriage 15, ride under the adjacent edge of the topmost record, and the vertical portions of said hooks, through their engagement with the record, shove the record from the magazine. During this time the forward edge of the record is resting upon the end portion of the relatively deep hook 35, the relation of the record to the hooks 32 and 35, at this stage of the operation, being illustrated in Fig. 9. By the time the record that has just been removed from the magazine arrives at playing position on the turntable a projection or pin 160, that is carried by the link 53, strikes the arm 6 and moves it to rock the shaft 5 against the tension of the spring 7 and swing the leaf 4 downwardly to the substantially vertical position indicated in Fig. 2. At the same time the fingers 13 on the shaft 12 are rocked upwardly into contact with the record through the medium of a link 161 that has one of its ends pivoted at 162 to the outer end of an arm 163 that is secured to the rearward extremity of the shaft 12, as best shown in Figs. 3 and 4. The link 161 is reciprocably supported at its end opposite the arm 163 within a guide 165 on a vertical member 166 of the machine frame, and the link is moved in a direction to rock the shaft 12 so as to lower the fingers 13 by means of a spring 167 that has one end connected to the link and its opposite end anchored to the frame member 166. A pin 168 projects from the side of the link 161 in the path of a striker 170 that is carried by the arm 51 so that as said arm swings toward its extreme left hand position (as viewed in Fig. 3) it will project the link against the tension of the spring 167 and rock the shaft 12 as above explained. The record, now in contact with the record rests 9 on the leaf 4, projects sufficiently beyond the free edge of the leaf to engage the rails 10 as the leaf is swung to approximately vertical position and, swinging about its points of bearing on the rails 10 as a fulcrum, the record tilts over against the fingers 13. As the arm 51 starts on its return movement the spring 167 retracts the link 161 and, through the arm 163 and shaft 12, lowers the fingers 13 to their normal position and, in returning to this position, the fingers gently lower the record onto the rails 10 without any perceptible noise. To assist in so depositing the record upon the rails and to properly position it thereon for cooperation with the shifting mechanism, I employ a buffer spring 171 that is secured to the right hand end of the machine frame, as shown in Figs. 1 and 2.

It will be noted from the above that, as the record is acted upon by the leaf 4 and fingers 13, it is inverted with respect to the position it occupied on the turntable; and it will appear as this description proceeds that the record is returned to the magazine in this reversed position.

When the carriage 15 is advanced to its extreme forward position, the lugs 28 on the rod 24 of the carriage structure will occupy a position forwardly of the record that has just been deposited upon the rails 10 so that when the carriage is returned to its normal position, said lugs will engage said record and slide it to a position intermediate the one wherein it was deposited upon the rails by the fingers 13 and a position in the bottom of the magazine. A record occupying this intermediate position is adapted to be engaged by the lugs 27 on the rod 23 of the carriage when the carriage is in its extreme forward position. Consequently, as the carriage returns and moves the record from the reversing mechanism to the central or intermediate position, the record previously shifted from the reversing mechanism to intermediate position is advanced by the lug 27 to its position in the bottom of the magazine, and in which position it has its diametrically opposed edge portions engaged beween adjacent convolutions of the threads of the screws 80. The polished top surfaces of the rails 10 insure easy movement of the records along the track or guideway constituted of said rails and prevent injury to the records.

While the shaft 46 is making a rotation to accomplish the operations above described, a like movement is transmitted therefrom through the beveled pinions 91 and 90, the shafts 85 and the spur gears 86 and 87 to the shafts 81 of the screws 80 so as to impart to said screws a complete rotation which results in all of the records in the magazine being elevated a distance corresponding to the pitch of the screws. In the drawings, the thickness of the records and screw threads, and the pitch of the screws, are exaggerated somewhat for the sake of clearness, and as a consequence of this the capacity of the magazine is shown as relatively small. In practice, the magazine accommodates a considerably greater number of records.

As the records are moved upwardly within the magazine by the action of the screws 80, the ones adjacent the top are urged forwardly by the inwardly deflected upper end of the record engaging surface of the guide 92 so as to cause their edges adjacent said guide to escape the hooks 32, as best illustrated in Fig. 6; and I shall now describe the manner in which the relatively deep hook 35 is engaged beneath the opposite edge of the topmost record.

As a preface to this I shall first explain how the hook 35 is disengaged from the record when the record has been transferred to playing position under the turntable. As the carriage closely approaches its extreme advanced position, the vertically disposed end of a pin 175 that is fastened to the shaft 34 of the carriage, and which shaft has fastened to it the hook 35, engages an abutment 176 (Figs. 4 and 9) that depends from the lever 104 so that the forward movement of said pin 175 is obstructed. This initiates the rocking of the shaft 34 in a direction to withdraw the nose of the hook from beneath the record, and such movement of the shaft is instantly completed by the spring 37 as soon the trigger 36 to which said spring is attached is rocked sufficiently to throw the spring over center. The spring then serves to retain the trigger 36 against the stop 40, and the hook 35 in ineffective position, until the carriage returns toward, and closely approaches, its normal position. As the carriage approaches normal position, the trigger 36 rides beneath the overhanging upper end of a wiper 177 (Figs. 1 and 2) that is carried by the machine frame, and this wiper returns the trigger to its depressed position and throws the spring 37 over center in the other direction so as to cause it to maintain the trigger in this condition. This action of the trigger rocks the shaft 34 to swing the nose of the relatively deep hook 35 beneath the top record in the magazine.

As the carriage 15 approaches its extreme forward position a striker 178, that is shown as adjustably connected to the link 53, engages the pin 132 on the tone arm 99 and rotates said tone arm on its pivotal axis so as to swing its forward end toward the periphery of the turntable, the shoe 107 that sustains the sound reproducer 100, sliding along the guide portion 106 of the arm 104 thereby to dispose the sound reproducer in starting position. As the pin 132 is swung as above described it overrides the adjacent inclined end of the lever 129 and rocks said lever against the tension of spring 133 to withdraw the bridge plate 128 from the contact points 127 and thus open the switch 125, breaking the motor circuit at this point. However, prior to interrupting the circuit by the opening of this switch, and alternative circuit is established through the switch 126, as I shall now explain. Shortly after the start of the carriage in its forward direction and as soon as the part 146, through which connection is effected between the link 53 and the rear bar 16 of the carriage, rides over the cam portion 138 of the lever 137, it depresses the lever against the tension of the spring 140 thereby to lower the plunger 136 into the mercury in the cup of the switch 126 and reengage the ledge 141 of the latch 142 with the adjacent end of the lever 137 so as to hold said lever in its newly assumed position until the latch is again withdrawn from the lever through the striking of its extension 145 by the aforesaid part 146 which does not occur until the carriage resumes its fully retracted position. Therefore, so long as the manually operated switch 155 is closed, and notwithstanding the fact that switch 125 is open, the motor will continue to receive its supply of current.

When it is desired to stop the machine, the manually operated switch 155 is opened. If this is done during the playing of a record or at any time prior to the shifting of a played record from the turntable and the delivery of another record thereto from the magazine, the machine will continue to operate by reason of the fact that the motor 55 is supplied with current through the circuit including the switch 125, said switch remaining closed as above explained until the tone arm is swung to starting position by the engagement of the striker 178 with the pin 132. Now, assuming that the manually operated switch 155 is open and that the striker 178 has, through the intervention of the pin 132, returned the tone arm to starting position, the lever 129 will be rocked by said pin in a direction to open the switch 125 and stop the motor. Thus, when the machine stops, the carriage will be in its forward position with the lever 104 lifted thereby to sustain the centering pin 105 out of engagement with the turntable and the sound reproducer with its needle or stylus free from the record and with the carriage entirely withdrawn from above the magazine. With the parts in this condition, the record on the turntable may be reversed or removed and another substituted therefor at will; and while the machine is idle, or at any time during the playing of a record, the gate 93 may be opened and all, or any part, of the records may be withdrawn edgewise from the magazine and re-arranged as desired. The turntable is, of course, held against rotation by the brake 118 at all times excepting when the carriage 15 is in its normal position, that is, the position which it occupies when the machine is in operation and a record is being played.

Having thus described my invention, what I claim is:

1. In a sound reproducing machine of the class set forth, the combination of a horizontal turntable, a sound reproducer associated therewith, means for rotating the turntable, means at one side of the turntable for supporting a series of records in horizontal position one above another and out of contact with one another and for advancing the records from one end toward the other end of the series, and means for moving a record from one end of the series to the turntable, and for removing a record from the turntable, reversing it, and returning it to the opposite end of the series.

2. In a sound reproducing machine of the class set forth, the combination of a horizontal turntable, a sound reproducer associated therewith, means for rotating the turntable, vertically disposed screws at one side of the turntable for supporting records horizontally with the edge portions of the records resting directly upon the threads of the screws, and means for moving a record laterally from the screws to the turntable.

3. In a sound reproducing machine of the class set forth, the combination of a horizontal turntable, a sound reproducer associated therewith, means for rotating the turntable, vertically disposed screws at one side of the turntable for supporting a series of records in horizontal position, means for rotating said screws so as to elevate the records supported thereby, and means for moving records from one end of the series to the turntable and from the turntable to the opposite end of the series.

4. In a sound reproducing machine of the class set forth, the combination of a horizontal turntable, a sound reproducer associated therewith, means for rotating the turntable, vertically disposed screws at one side of the turntable for supporting a series of records in horizontal position, means for rotating said screws so as to elevate the records supported thereby, and means for moving a record from the top of the series to the turntable, and for removing a record from the turntable, reversing it, and returning it to the bottom of the series.

5. In a sound reproducing machine of the class set forth, the combination of a horizontal turntable, a sound reproducer associated therewith, means for rotating the turntable, vertically disposed screws at one side of the turntable for supporting a series of records in a horizontal position with the edge portions of the records resting directly upon the threads of the screws, and with the topmost record of the series in approximately the plane of the turntable, and means for bodily supporting a record and moving it laterally from the screws to, and depositing it upon, the turntable.

6. In a sound reproducing machine of the class set forth, the combination of a horizontal turntable, a sound reproducer associated therewith, means for rotating the turntable, vertically disposed screws at one side of the turntable for supporting a series of records in horizontal position with the edge portions of the records resting directly upon the threads of the screws, said screws being arranged on opposite sides of the series of records, the threads of the screws on one side being opposite in direction to the threads of the screws on the other, means for rotating the screws on the opposite sides of the records in opposite directions, the screws tending, through their frictional contact with the records, to shift the records laterally, a guide against which the records are so shifted, and mechanism for moving records laterally from the series to the turntable and for returning the records from the turntable to said series.

7. In a sound reproducing machine of the class set forth, the combination of a horizontal turntable, a sound reproducer associated therewith, means for rotating the turntable, vertically disposed screws at one side of the turntable for supporting a series of records with the records in substantially horizontal position, and with the edge portions of the records resting directly upon the threads of the screws, said screws being arranged on opposite sides of the records, the threads of the screws on one side being opposite in direction to the threads of those on the other, means for removing records from one end of the series and transferring them to the turntable, means for rotating the screws on the oppposite sides of the records in opposite directions so as to tend to move the records laterally from between the screws, and a guide against which the records are urged by such action, said guide being shiftable from record engaging position so that the records may be manually removed from the screws.

8. In a sound reproducing machine of the class set forth, the combination of a horizontal turntable, a sound reproducer associated therewith, means for rotating the turntable, vertically disposed screws at one side of the turntable for supporting a series of records with the records substantially horizontal and with the top record of the series in approximately the plane of the turntable, a carriage movable back and forth horizontally above the turntable and above the series of records supported by the screws, record engaging means on the carriage, means for rotating the screws to elevate the records supported thereby and to present the topmost record of the series to the record engaging means on the carriage, and mechanism for moving the carriage thereby to shift said topmost record from the series onto the turntable in operative relation to the sound reproducer.

9. In a sound reproducing machine of the class set forth, the combination of a horizontal turntable, a sound reproducer associated therewith, means for rotating the turntable, vertically disposed screws at one side of the turntable for supporting a series of records with the records substantially horizontal and with the top record of the series in approximately the plane of the turntable, a carriage movable back and forth horizontally above the turntable and above the series of records supported by the screws, record sustaining means on the carriage, means for rotating the screws to elevate the records supported thereby and to present the topmost record of the series to the record sustaining means, and mechanism for moving the carriage thereby to shift said topmost record while supported bodily by the sustaining means from the series onto the turntable in operative relation to the sound reproducer.

10. In a sound reproducing machine of the class set forth, the combination of a horizontal turntable, a sound reproducer associated therewith, means for rotating the turntable, vertically disposed screws at one side of the turntable for supporting a series of records with the records substantially horizontal and with the top record of the series in approximately the plane of the turntable, a carriage movable back and forth horizontally above the turntable and above the series of records supported by the screws, record engaging means on the carriage, means for rotating the screws in a direction to elevate the records supported thereby and present the topmost record of the series to the record engaging means, the engaging means being actuated by reason of movement of the carriage to take hold of the top record, and means for moving the carriage thereby to transfer said top record to the turntable, the record engaging means being actuated by reason of the movement of the carriage to release said record and deposit it on the turntable.

11. In a sound reproducing machine of the class set forth, the combination of a horizontal turntable, a sound reproducer associated therewith, means for rotating the turntable, means at one side of the turntable for supporting a series of records with the records above one another and substantially horizontal, a carriage movable back and forth horizontally above the turntable and above the series of records, record engaging means on the carriage, means for advancing the records from one end toward the other end of the series and for presenting the top record of the series to the record engaging means, the engaging means being actuated by reason of movement of the carriage to take hold of the top record of the series, and means for moving the carriage thereby to transfer said top record to the turntable, the record engaging means being actuated by reason of movement of the carriage to release said record and deposit it on the turntable.

12. In a sound reproducing machine of the class set forth, the combination of a horizontal turntable, a sound reproducer associated therewith, means for rotating the turntable, a magazine at one side of the turntable for supporting a series of records one above another and in horizontal position and for advancing the records from the bottom toward the top of the series, a carriage movable back and forth above the magazine and turntable, a relatively shallow hook supported by the carriage for engagement with the edge of the top record of the series that is remote from the turntable, a guide for deflecting the top record of the series to a position in advance of said hook, a relatively deep hook pivotally supported by the carriage and adapted to be engaged beneath the edge portion of the record opposite the first mentioned hook, means for moving the carriage thereby to transfer a record from the magazine to the turntable, and means actuated by reason of the movement of the carriage for shifting the second mentioned hook to record supporting position when the hooks are in receiving relation to the top record of the series and for disengaging said second mentioned hook from the record when the record is carried to a position above the turntable.

13. In a sound reproducing machine of the class set forth, the combination of a horizontal turntable, a sound reproducer associated therewith, means for rotating the turntable, vertically disposed screws at one side of the turntable for supporting a series of records with the records horizontal and resting at their edges directly upon the threads of the screws and with the topmost record of the series in approximately the plane of the turntable, said screws being arranged on opposite sides of the records, the threads of the screws on one side being opposite in direction to the threads of those on the other, means for rotating the opposed screws in opposite directions and in a direction tending to shift the records laterally from between the screws and away from the turntable, a guide against which the records are urged by such action, a carriage movable back and forth above the screws and turntable, a relatively shallow hook supported by the carriage for engagement with the edge of the topmost record that is adjacent the guide, the guide being deflected inwardly at its upper end so as to move the topmost record to a position in advance of said hook, a relatively deep hook pivotally supported by the carriage and adapted to be engaged beneath the edge portion of the record opposite the first mentioned hook, means for moving the carriage thereby to transfer a record from the screws to the turntable, and means actuated by reason of the movement of the carriage for shifting the second mentioned hook to record supporting position when the hooks are in receiving relation to the topmost record of the series and for disengaging said second mentioned hook from the record when the record is carried to a position above the turntable.

14. In a sound reproducing machine of the class set forth, the combination of a horizontal turntable, a sound reproducer associated therewith, means for rotating the turntable, means for supporting a series of records one above another in horizontal position at one side of the turntable, a shaft supported for oscillation in substantially the plane of the turntable and at the side thereof remote from the record supporting means, a leaf mounted on said shaft for receiving records removed from the turntable, means tending to maintain the leaf in substantially horizontal position, a member on said shaft, means movable back and forth above the record supporting means and the turntable for shifting records from the top of the series to the turntable and from the turntable to said leaf, a part associated with said record shifting means for engagement with the member on the shaft thereby to oscillate the shaft and depress the leaf when said record shifting means is operated, a guideway extending from below said leaf to the record supporting means, mechanism actuated by the record shifting means for lowering a record from the leaf to said guideway, and an instrumentality for moving records along said guideway to the bottom of the series.

15. In a sound reproducing machine of the class set forth, the combination of a horizontal turntable, a sound reproducer associated therewith, means for rotating the turntable, a horizontal track situated below the turntable and extending beyond the opposite sides thereof, vertical screws located on the opposite sides of said track and to one side of the turntable and extending from substantially the horizontal plane of the track to the plane of the turntable, means for rotating said screws, said screws being arranged to support a series of records and to feed the same upwardly as the screws are rotated, means beyond the side of the turntable remote from the screws for lowering records to said track, and means for shifting records from the screws to the turntable, from the turntable to said lowering means, and along the track from below said lowering means to the bottom of said screws.

16. In a sound reproducing machine of the class set forth, the combination of a horizontal turntable, a sound reproducer associated therewith, means for rotating the turntable, a horizontal track situated below the turntable and extending beyond the opposite sides thereof, vertical screws located on the opposite sides of said track to one side of the turntable and extending from substantially the horizontal plane of the track to the plane of the turntable, means for rotating said screws, said screws being arranged to support a series of records and feed the same upwardly as of records and feed the same upwardly as the screws are rotated, record lowering and reversing means beyond the side of the turntable remote from said screws for turning a record over and depositing it upon the aforesaid track, and means for shifting records from the aforesaid screws to the turntable and from the turntable to the reversing and lowering means and along said track from below the latter means to the aforesaid screws.

17. In a sound reproducing machine of the class set forth, the combination of a frame structure, a turntable supported within said frame for rotation in a substantially horizontal plane, opposed screws situated at one side of the turntable and rotatably supported in a vertical position by said frame and by and between which records are adapted to be sustained in substantially horizontal position, with the edge portions of the records resting directly upon the threads of the screws, a shaft journaled within said frame, driving connections between said shaft and the screws whereby the screws are operated to elevate the records sustained thereby when said shaft is rotated, means for rotating said shaft, and means for shifting records laterally from said screws to the turntable.

18. In a sound reproducing machine of the class set forth, the combination of a frame structure, a shaft journaled therein, opposed pairs of vertically disposed screws rotatably supported by the frame structure above said shaft, driving connections between the shaft and said screws, the screws being adapted to support records in a substantially horizontal position and to feed the records longitudinally of the screws when the screws are rotated, means for driving the aforesaid shaft, a turntable rotatably supported in a substantially horizontal position by said frame structure to one side of the screws, means for rotating the same, a sound reproducer associated with the turntable, and means for shifting records laterally from the screws to the turntable.

19. In a sound reproducing machine of the class set forth, the combination of a horizontal turntable, a sound reproducer associated therewith, means for rotating the turntable, a magazine at one side of the turntable for supporting a plurality of records horizontally one above another and for feeding the records upwardly, a record shifting device movable back and forth across the magazine and turntable, said device incorporating a member that is adapted to be moved toward the turntable and beneath the topmost record in the magazine and a second member in opposed relation to the first member that is adapted to be swung beneath the edge of the topmost record adjacent the turntable, a guide that is engaged by the records as they are elevated within the magazine for presenting the topmost record in proper relation to said members, and means actuated by reason of the movement of the record shifting device for swinging the second mentioned member between record supporting and record releasing positions.

20. In a sound reproducing machine of the class set forth, the combination of a horizontal turntable, a sound reproducer associated therewith, means for rotating the turntable, a magazine situated at one side of the turntable for supporting a plurality of records one above another in substantially horizontal position and operable to feed the records upwardly, a carriage movable back and forth above the magazine and turntable for transferring the top record from the magazine to the turntable, the carriage involving hook like members for engagement with the edge of the top record remote from the turntable, a shaft supported by the carriage adjacent the opposite edge of the record, a relatively deep hook secured to said shaft for engagement beneath the adjacent edge of the record, a trigger secured to said shaft for oscillating the same so as to swing the hook between record sustaining and record releasing positions, a spring so connected with said shaft as to tend to hold the same in either of its extreme positions, abutments wherewith parts on said shaft are engaged as the carriage arrives at its extreme positions for rocking the shaft, and a guide arranged to be engaged by the records as they are moved upwardly in the magazine for properly presenting the topmost record to said hooks.

21. In a sound reproducing machine of the class set forth, the combination of a horizontal turntable, a sound reproducer associated therewith, means for rotating the turntable, a magazine situated at one side of the turntable for supporting a plurality of records one above another in substantially horizontal position and operable to feed the records upwardly, a guide arranged to be engaged by the records as they are moved upwardly for shifting the records slightly toward the turntable, a gate for the magazine by which said guide is carried, a carriage movable back and forth above the magazine and turntable for transferring the top record from the magazine to the turntable, the carriage involving hook like members for engagement with the edge of the top record remote from the turntable, a shaft supported by the carriage adjacent the opposite edge of the record, a relatively deep hook secured to said shaft for engagement beneath the adjacent edge of the record, a trigger secured to said shaft for oscillating the same so as to swing the hook between record sustaining and record releasing positions, a spring so connected with said shaft as to tend to hold the same in either of its extreme positions, and abutments wherewith parts on said shaft are engaged as the carriage arrives at its extreme positions for rocking the shaft.

In testimony whereof, I hereunto affix my signature.

THOMAS W. SMALL.